US012801934B2

(12) United States Patent
Ma et al.

(10) Patent No.: US 12,801,934 B2
(45) Date of Patent: Nov. 17, 2026

(54) APPARATUS AND METHOD FOR BATCH REBALANCE IN DISTRIBUTED DATA PARALLEL DNN TRAINING

(71) Applicant: Intel Corporation, Santa Clara, CA (US)

(72) Inventors: Guokai Ma, Shanghai (CN); Jiong Gong, Shanghai (CN); Hongzhen Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 18/571,151

(22) PCT Filed: Oct. 18, 2021

(86) PCT No.: PCT/CN2021/124478

§ 371 (c)(1),
(2) Date: Dec. 15, 2023

(87) PCT Pub. No.: WO2023/065076

PCT Pub. Date: Apr. 27, 2023

(65) Prior Publication Data

US 2024/0281667 A1 Aug. 22, 2024

(51) Int. Cl.
*G06N 3/098* (2023.01)

(52) U.S. Cl.
CPC .................................... *G06N 3/098* (2023.01)

(58) Field of Classification Search
None
See application file for complete search history.

(56) References Cited

U.S. PATENT DOCUMENTS 11,922,220 B2 * 3/2024 Haghighat ............ G06F 11/302
11,966,843 B2 * 4/2024 Arunachalam ....... G06F 1/3203
11,977,986 B2 * 5/2024 Zhang .................... G06N 20/00
(Continued)

FOREIGN PATENT DOCUMENTS

CN 112732444 A 4/2021

OTHER PUBLICATIONS

International Searching Authority, "International Search Report," issued in connection with International Patent Application No. PCT/CN2021/124478, mailed Jul. 19, 2022, 4 pages.
(Continued)

*Primary Examiner* — Maikhanh Nguyen
(74) *Attorney, Agent, or Firm* — Hanley, Flight & Zimmerman, LLC

(57) ABSTRACT

Provided herein are apparatus and methods for batch rebalance in distributed data parallel DNN training. An apparatus includes interface circuitry; and processor circuitry coupled with the interface circuitry, wherein the processor circuitry is to: obtain sorted samples of a mini batch via the interface circuitry, wherein the sorted samples are in an ascend or descend order based on a volume of each of the samples; and assign the sorted samples to each of a plurality of local batches one by one in an order from a first local batch to a last local batch of the plurality of local batches and then from the last local batch to the first local batch until all of the sorted samples are assigned. Other embodiments may also be disclosed and claimed.

23 Claims, 8 Drawing Sheets

(56) References Cited

U.S. PATENT DOCUMENTS

| | | | | |
|---|---|---|---|---|
| 2017/0039485 | A1 | 2/2017 | Kadav | |
| 2017/0228645 | A1* | 8/2017 | Wang | G06N 3/045 |
| 2017/0308789 | A1* | 10/2017 | Langford | G06N 3/045 |
| 2018/0356803 | A1 | 12/2018 | Liu et al. | |
| 2019/0042934 | A1* | 2/2019 | Arunachalam | G06F 1/3203 |
| 2019/0332422 | A1 | 10/2019 | Liu et al. | |
| 2020/0042362 | A1* | 2/2020 | Cui | G06N 3/0985 |
| 2020/0089541 | A1 | 3/2020 | Zargahi et al. | |
| 2021/0133505 | A1 | 5/2021 | Wang et al. | |

OTHER PUBLICATIONS

International Searching Authority, “Written Opinion,” issued in connection with International Patent Application No. PCT/CN2021/124478, mailed Jul. 19, 2022, 4 pages.

* cited by examiner

APPARATUS AND METHOD FOR BATCH REBALANCE IN DISTRIBUTED DATA PARALLEL DNN TRAINING

CROSS-REFERENCE TO RELATED APPLICATION

This Patent arises from a US National Stage of International Application No. PCT/CN2021/124478, filed Oct. 18, 2021, and entitled "APPARATUS AND METHOD FOR BATCH REBALANCE IN DISTRIBUTED DATA PARALLEL DNN TRAINING". Priority to International Application No. PCT/CN2021/124478 is hereby claimed. International Application No. PCT/CN2021/124478 is hereby incorporated by reference in its entirety.

TECHNICAL FIELD

Embodiments of the present disclosure generally relate to Deep Neural Network (DNN), and in particular to apparatus and methods for batch rebalance in distributed data parallel DNN training.

BACKGROUND ART

In recent years, machine learning and/or artificial intelligence have increased in popularity. For example, machine learning and/or artificial intelligence may be implemented using neural networks. Neural networks are computing systems inspired by the neural networks of human brains. A neural network can receive an input and generate an output. The neural network can be trained (e.g., can learn) based on feedback so that the output corresponds to a desired result. Once trained, the neural network can make decisions to generate an output based on any input. Distributed Deep Neural Network (DNN) training parallelizes Deep Learning (DL) training on multiple computation device or systems and shorten the prolonged training time from days/weeks to hours.

SUMMARY

An aspect of the disclosure provides an apparatus, comprising: interface circuitry; and processor circuitry coupled with the interface circuitry, wherein the processor circuitry is to: obtain sorted samples of a mini batch via the interface circuitry, wherein the sorted samples are in an ascend or descend order based on a volume of each of the samples; and assign the sorted samples to each of a plurality of local batches one by one in an order from a first local batch to a last local batch of the plurality of local batches and then from the last local batch to the first local batch until all of the sorted samples are assigned.

An aspect of the disclosure provides an apparatus, comprising: interface circuitry; and processor circuitry coupled with the interface circuitry, wherein the processor circuitry is to: obtain sorted samples of a mini batch via the interface circuitry, wherein the sorted samples are in an ascend or descend order based on a volume of each of the samples; estimate a cost of each of a plurality of local batches; and assign the sorted samples to the plurality of local batches based on the cost of each of the plurality of local batches.

An aspect of the disclosure provides a method, comprising: obtaining sorted samples of a mini batch, wherein the sorted samples are in an ascend or descend order based on a volume of each of the samples; and assigning the sorted samples to each of a plurality of local batches one by one in an order from a first local batch to a last local batch of the plurality of local batches and then from the last local batch to the first local batch until all of the sorted samples are assigned.

An aspect of the disclosure provides a method, comprising: obtaining sorted samples of a mini batch, wherein the sorted samples are in an ascend or descend order based on a volume of each of the samples; estimating a cost of each of a plurality of local batches; and assigning the sorted samples to the plurality of local batches based on the cost of each of the plurality of local batches.

An aspect of the disclosure provides an apparatus comprising means for implementing the methods of the disclosure.

An aspect of the disclosure provides a computer-readable medium having instructions stored thereon, the instructions when executed by processor circuitry cause the processor circuitry to perform the methods of the disclosure.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Figure 1:
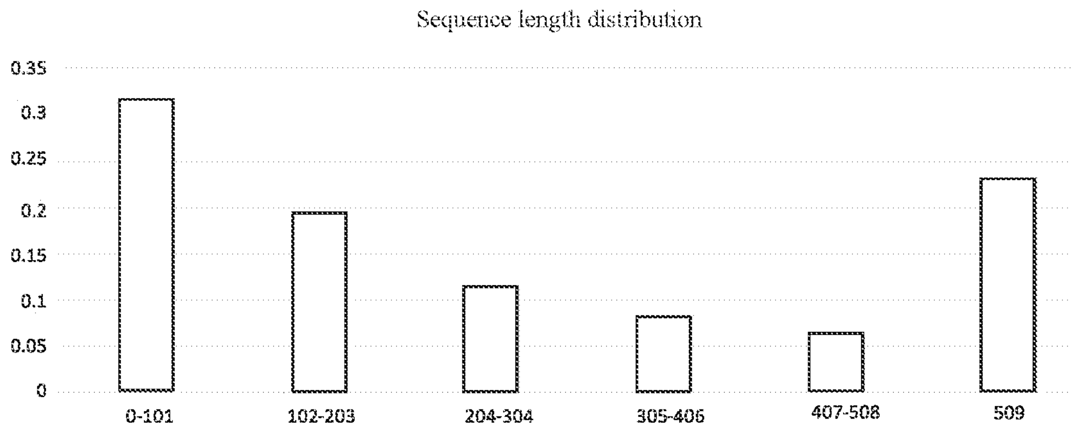
FIG. 1 illustrates an example of sequence length distribution in accordance with some embodiments of the disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Distributed Deep Neural Network (DNN) training parallelizes Deep Learning (DL) training on multiple computation device or systems and shorten the prolonged training time e.g., from days/weeks to hours. Synchronous Stochastic Gradient Descent (SGD) is the most used distributed training method since it does not impact convergence with existing single worker hyper parameters. In synchronous SGD setting, a mini batch of training data is split into local batches for respective workers (or nodes). For each iteration, in parallel, each worker loads their own local batch, preprocesses them and feeds them into DNN for computing gradients after which the workers sync-up the parameter gradients and update the parameters for next iteration. Data preprocessing usually includes decoding (e.g. Joint Photographic Experts Group (JPEG) image decoding) and augmentation (e.g. image resizing) with randomness.

In order to maximize scaling efficiency, it is crucial for each worker to compute each iteration with the same duration. Otherwise faster workers have to wait for slower workers at the sync-up point, which is called straggler effect. The straggler effect may impact the scaling efficiency of distributed DL training on, for example, CPU-based systems. Straggler is usually a limiting factor of large-scale distributed training systems because adding more computing resource for training won't bring same amount of training throughput improvement as in a small scale training system.

Variable-sized dataset is one of the key reasons causing the computation variance. In typical use cases like Natural Language Processing (NLP), object detection and image classification, computation variance could come from increased DNN computation. The variance is correlated with input volume (e.g., all input dimensions multiply together).

FIG. 1 illustrates an example of sequence length distribution in accordance with some embodiments of the disclosure. As shown in FIG. 1, for example, in an enwiki dataset used to train Bidirectional Encoder Representation from Transformers (BERT) (language model), the input sequence length could change from 1 to 509. X-axis means sequence length range and Y-axis means percentage in a whole dataset (e.g., 157M samples). The high variance of sequence length of input data is correlated with high variance of computing time among workers for local batches.

In a local batch, sometimes samples need to be padded to largest volume of the samples for a padded implementation of model, and sometimes samples do not need to be padded for an unpadded implementation of model. In the former case, it is better to put samples with similar size in the same local batch. In the latter case, there is no such restriction.

There are several solutions to mitigate or avoid straggler effect among workers. A first solution is asynchronous SGD. It doesn't sync between workers after each iteration, thus the straggler effect among workers is avoided. In a second solution, data is sorted according to input volume before the epoch. It may lower the variance of data in each iteration, because data with close volume are put together in the same mini batch. In a third solution, input data is padded to equal volume. It may force each worker to do the same amount of computation.

However, the first solution and the second solution might impact test accuracy of training. Asynchronous SGD may suffer from stale gradients issue which might slow down the convergence of SGD. The best SGD based training practice suggests that the dataset is shuffled before each epoch, rather than sorting the data. For the third solution, computation is wasted on padded part of input data, which doesn't really help improve performance in avoiding straggler effect and waste more power than no padding.

This disclosure proposes methods to redistribute the mini batch among workers with a balanced strategy. In the methods, for example, samples of a mini batch is sorted by their volume, then the samples are assigned to each worker (local batch) in a way that each worker requires approximately similar duration to run a training iteration. This disclosure may solve the straggler effect so as to improve scaling efficiency of large-scale distributed DL training systems and provide better Return on Investment (ROI) of distributed DL solutions. Different from the above three solutions that resolve straggler effect, the methods in the disclosure may minimalize straggler effect without changing math or affecting convergence, since redistribution happens inside the mini batch.

Figure 2:
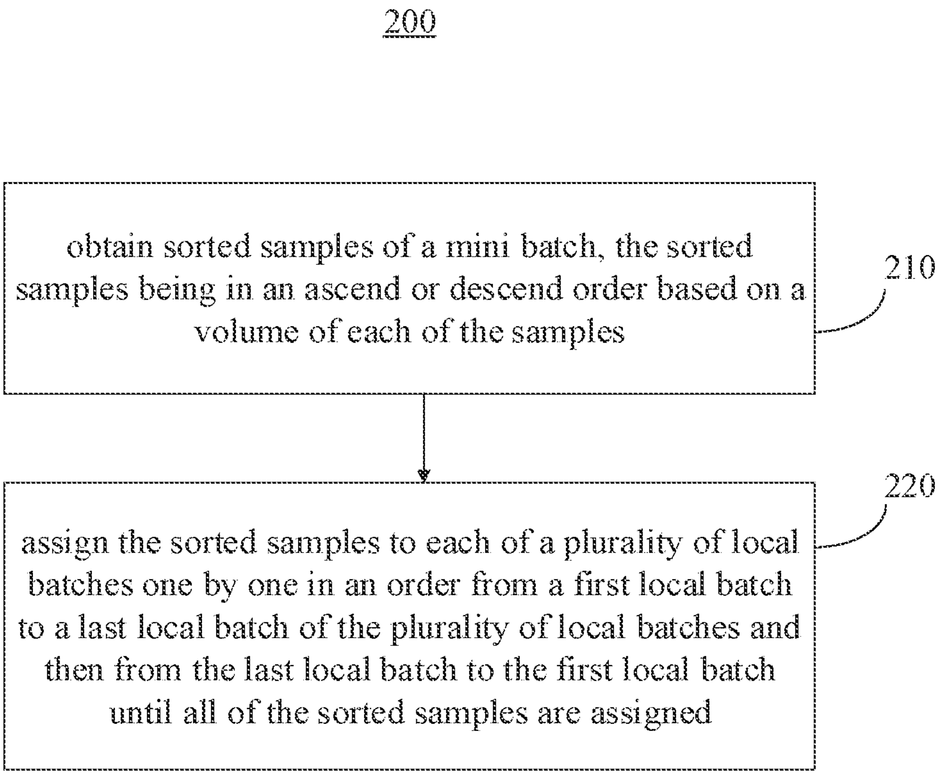
FIG. 2 illustrates a flowchart of a method for batch rebalance in accordance with some embodiments of the disclosure.

FIG. 2 illustrates a flowchart of a method 200 for batch rebalance in accordance with some embodiments of the disclosure. The method 200 may include steps 210 and 220.

At 210, sorted samples of a mini batch are obtained. The sorted samples are in an ascend or descend order based on a volume of each of the samples.

At 220, the sorted samples are assigned to each of a plurality of local batches one by one in an order from a first local batch to a last local batch of the plurality of local batches and then from the last local batch to the first local batch until all of the sorted samples are assigned.

In some embodiments, the method 200 may include more or less steps, which is not limited in the disclosure.

In some embodiments, the method 200 may be applicable for unpadded implementation of model.

Figure 3:
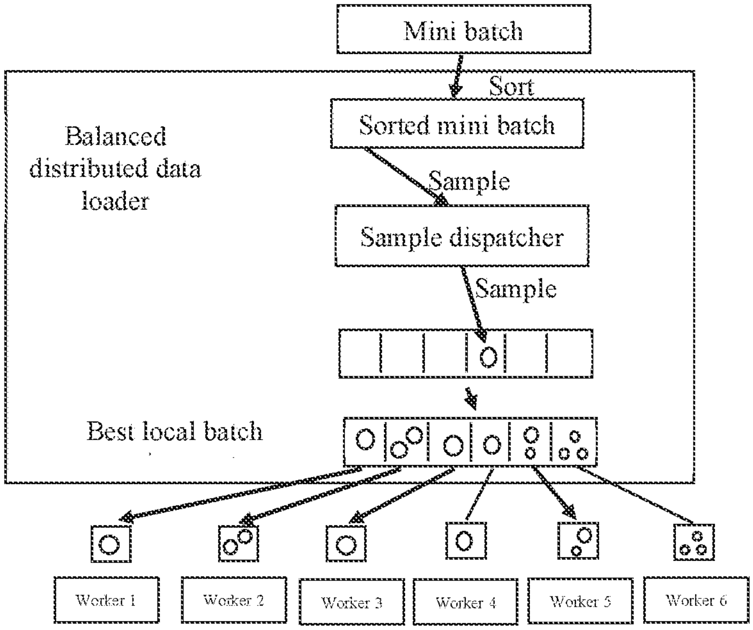
FIG. 3 illustrates a schematic diagram for batch rebalance in accordance with some embodiments of the disclosure.

FIG. 3 illustrates a schematic diagram for batch rebalance in accordance with some embodiments of the disclosure. The method 200 may be implemented with the components of FIG. 3.

In particular, as shown in FIG. 3, a balanced distributed data loader and a sample dispatcher are illustrated. In some embodiments, the sample dispatcher may be a part of the balanced distributed data loader. In some embodiments, the sample dispatcher and the balanced distributed data loader may be independent components. The disclosure is not limited in this aspect.

In some embodiments, the mini batch is randomly sampled from a whole dataset and passed to the balanced distributed data loader. The balanced distributed data loader may take samples of the mini batch. In some embodiments, the samples are sorted in descend order when a size of the mini batch is indivisible by the number of the local batches. Otherwise, the samples are sorted in either an ascend order or a descend order.

Initially all the local batches are empty. The sample dispatcher may assign samples one by one in sorted order to local batches, until all samples are assigned to the local batches. In one implementation of the sample dispatcher, the samples are assigned to the local batches in a zigzag round robin order. Once all the samples are assigned to the local batches, the best local batch assignment may be determined.

The balanced distributed data loader may assign the local batches to respective workers accordingly.

Below, the algorithm of zigzag round robin balancing (algorithm 1) is detailed.

| Algorithm 1: zigzag round robin balancing |
| --- |
| 1. Get sorted samples in the mini batch, if mini batch size cannot be divided by the number of workers, sort the samples from largest volume to smallest volume, otherwise the sort could be either ascend or descend. |
| 2. Initially all local batches are empty. |
| 3. (zig) Pick the next unassigned sample, assign to the first batch. |
| 4. (zig) Pick the next unassigned sample, assign to the second batch, repeat so on until one sample is assigned to the last batch. |
| 5. (zag) Pick the next unassigned sample, assign to the last batch. |
| 6. (zag) Pick the next unassigned sample, assign to the second to last batch, repeat so on until two samples are assigned to the first batch. |
| 7. Repeat zigs and zags until all samples are assigned to the batches. |
| 8. Assign samples in local batches to workers for one iteration of distributed training. |

In some embodiments, the method 200 may be understood in conjunction with the algorithm of zigzag round robin balancing. With the method 200, samples with small volume and large volume are mixed in the same local batch. The algorithm of zigzag round robin balancing may balance the total volume of each local batch with "zig" step(s) and "zag" step(s).

Figure 4:
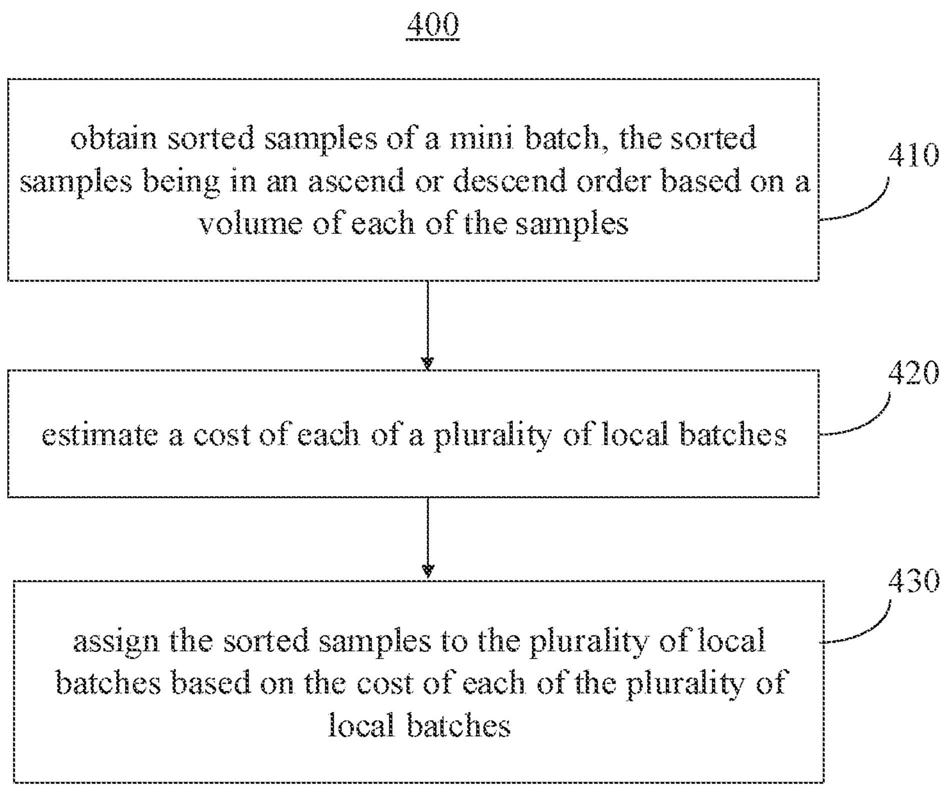
FIG. 4 illustrates a flowchart of a method for batch rebalance in accordance with some embodiments of the disclosure.

FIG. 4 illustrates a flowchart of a method 400 for batch rebalance in accordance with some embodiments of the disclosure. Compared with the method 200, the method 400 may at least include estimation of cost of local batches. The method 400 may include steps 410, 420 and 430. In some embodiments, the method 400 may include more or less steps, which is not limited in the disclosure.

At 410, samples of a mini batch are obtained. In some embodiments, the mini batch is randomly sampled from a whole dataset.

At 420, a cost of each of a plurality of local batches is estimated. In some embodiments, the estimation may performed by a component called batch cost estimator, which will be detailed in conjunction with FIG. 5 and FIG. 6 below.

At 430, the samples are assigned to the plurality of local batches based on the cost of each of the plurality of local batches.

Figure 5:
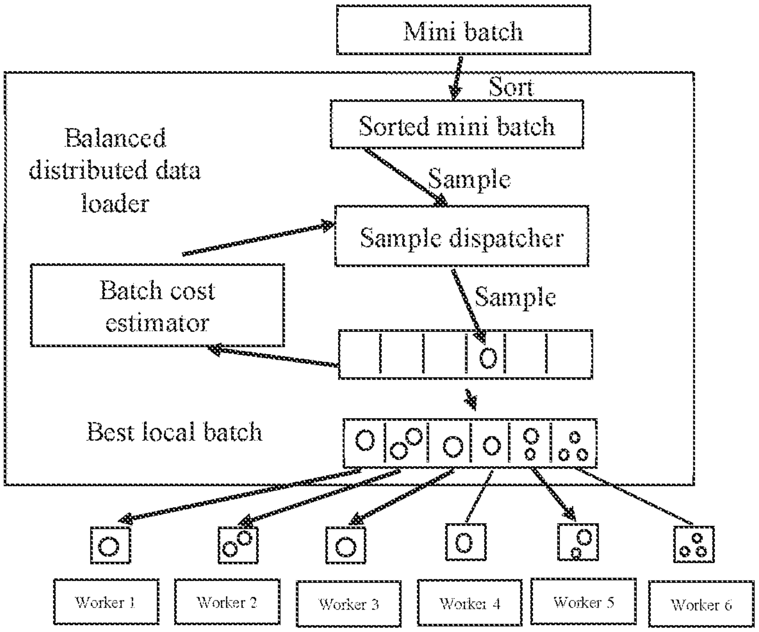
FIG. 5 illustrates a schematic diagram for batch rebalance in accordance with some embodiments of the disclosure.

In some embodiments, the method 400 may be applicable for unpadded implementation of model. For example, FIG. 5 illustrates a schematic diagram for batch rebalance in accordance with some embodiments of the disclosure. The method 400 may be implemented with the components of FIG. 5.

In particular, as shown in FIG. 5, the component of batch cost estimator is involved in addition to the balanced distributed data loader and the sample dispatcher described above, which will not be repeated here. The batch cost estimator may estimate a cost of a local batch. In some embodiments, the cost of the local batch is based on a compute time of the local batch (the respective worker) for the distributed training of the assigned samples or a total volume of the assigned samples for the local batch (the respective worker). In some embodiments, the cost of a local batch is based on other factor(s), which is not limited in this disclosure.

In some embodiments, the batch cost estimator and/or the sample dispatcher may be a part of the balanced distributed data loader. In some embodiments, these components may be independent ones coupled in a certain manner. The disclosure is not limited in this aspect.

In some embodiments, for example, as shown in FIG. 5, the samples of the method 400 are sorted in a descend order based on a volume of each of the samples. After estimation of cost of each local batch by the batch cost estimator, the sample dispatch may obtain the estimation result and assign a first sample of the samples with a largest volume to a local batch of the plurality of local batches with a smallest cost. Then the batch cost estimator may re-estimate the cost of each of the plurality of local patches and assign a second sample of the samples with a largest volume among remaining unassigned samples to a local batch of the plurality of local batches with a smallest cost after the re-estimation. Such estimation or re-estimation and the assignment are repeated until all samples in the mini batch are assigned to the local batches.

The embodiments of FIG. 5 may be understood in conjunction with an algorithm called greedy bag balancing (algorithm 2) below.

| Algorithm 2: greedy bag balancing |
| --- |
| 1. Get sorted samples in the mini batch from largest sample volume to smallest sample volume. |
| 2. Initially all local batches are empty. |
| 3. Compute cost of each local batch using batch cost estimator, pick a local batch with smallest cost. |
| 4. Pick the next unassigned sample, assign it to the local batch picked in step 3. |
| 5. Repeat 3 and 4 until all samples are assigned to local batches. |
| 6. Assign samples in local batches to workers for one iteration of distributed training. |

With the algorithm of greedy bag balancing, the samples are assigned to the local batches in an order from largest volume to smallest volume. Each time the local batch with smallest batch cost will be selected and the unassigned sample with largest volume will be assigned to this local batch, and thus the smallest samples in the mini batch could fill the gaps between local batches.

Figure 6:
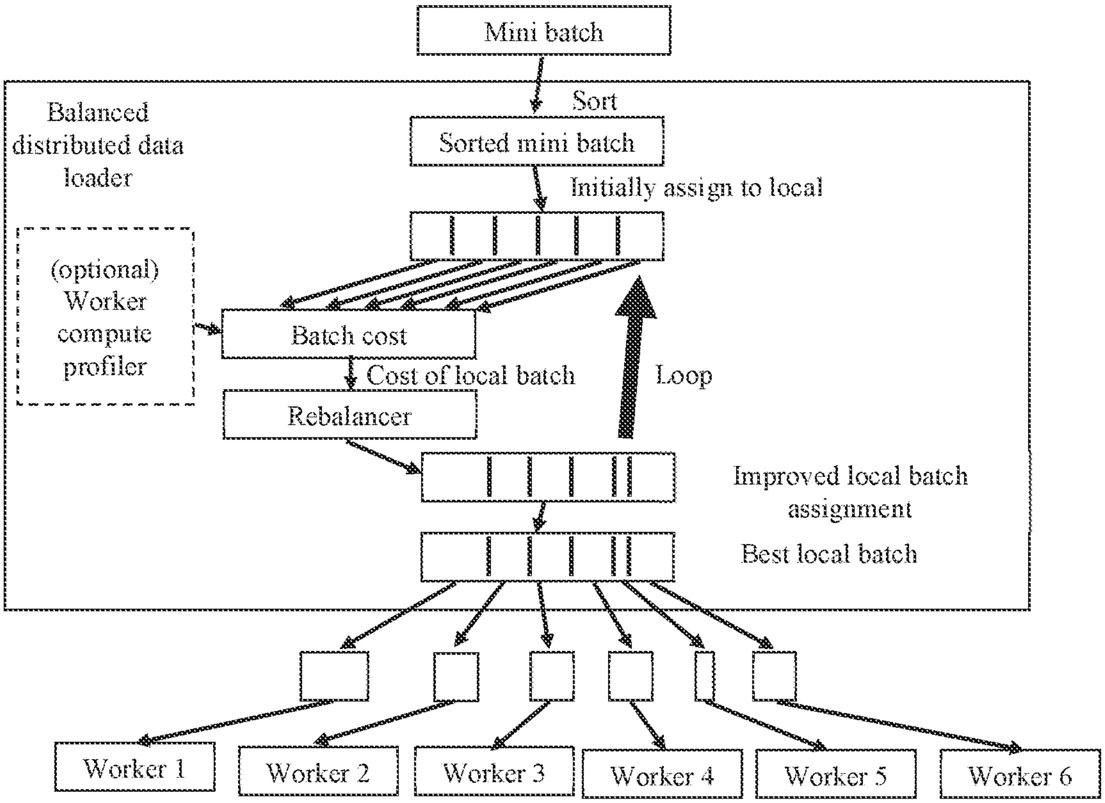
FIG. 6 illustrates a schematic diagram for batch rebalance in accordance with some embodiments of the disclosure.

In some embodiments, the method 400 may be applicable for both of unpadded and padded implementation of model. For example, FIG. 6 illustrates a schematic diagram for batch rebalance in accordance with some embodiments of the disclosure. The method 400 may be implemented with the components of FIG. 6.

In particular, as shown in FIG. 6, a component of rebalancer is involved instead of the above sample dispatcher, in addition to the balanced distributed data loader and the batch cost estimator described above, which will not be repeated here. Furthermore, a component of worker compute profiler is optional in some cases. The rebalancer may rebalance, based on estimation result of the batch cost estimator, the samples among local batches in such a way that reduces works from the local batches with heavy work, and increases works to the local batches with light work. The worker compute profiler may profile worker compute of previous iteration to provide alternative cost estimation for current local batch assignment.

In some embodiments, the batch cost estimator, the rebalancer, and/or the worker compute profiler may be a part of the balanced distributed data loader. In some embodiments, these components may be independent ones coupled in a certain manner. The disclosure is not limited in this aspect.

The embodiments of FIG. 6 may be understood in conjunction with an algorithm 3 and other operations below.

In some embodiments, in the beginning, a mini batch is randomly sampled from a whole dataset and passed to the balanced distributed data loader. The samples may be sorted according to their volume, then an initial local batch assignment is formed through a certain heuristic (e.g., each local batches may be assigned with the same number of samples). The best local batch assignment may be determined with following steps including those in algorithm 3.

| Algorithm 3: Assign samples in mini batch to local batches |
|---|
| 1. Decide batch size of each local batch through either initial heuristic or through rebalancer in the balanced distributed data loader. |
| 2. Assign samples with smallest volume size to the first batch, until #samples in the first batch equals to first local batch size. |
| 3. Assign remaining samples with smallest volume size to the second batch, until #samples in the second batch equals to second local batch size. |
| 4. Repeat 3 to third batch, forth batch, ... and so on, until samples with largest volume sizes are assigned to last local batch, with #samples in the last batch equals to last local batch size. |

After the assignment of samples to the local batches via the algorithm 3, the batch cost estimator may estimate the cost of each local batch. In one implementation of the batch cost estimator, for an unpadded model implementation, the total input volume of each local batch is calculated, and a heuristic function of total input volume is used to estimate the cost of each local batch. In another implementation of the batch cost estimator, for a pad model implementation, the maximum input volume of samples in the local batch is multiplied by the sample number of the local batch (e.g., all samples of local batch may be padded to the same volume of largest sample in the local batch). The result may be used by a heuristic function to estimate the cost of each local batch. In yet another implementation of the batch cost estimator with the optional worker compute profiler, the compute time spent by the worker in previous training iteration may be used by a heuristic function to estimate the cost of respective local batch.

After the estimation of the batch cost estimator, the rebalancer may check cost variance among the local batches. In one implementation, the local batch with largest cost and/or the local batch with smallest cost are identified. Then the rebalancer may adjust local batch size of the local batches with a heuristic in order to reduce cost variance among the local batches. For example, the local batch size with largest cost may be reduced by 1, for example, and/or the local batch size with smallest cost may be increased by 1, for example. The adjustment of the local batch size is based on the heuristic used, which is not limited in the disclosure.

Now the local batch size of some local batches has changed, so the algorithm 3 is used again to re-assign all samples to the local batches.

The adjusted local batches may be sent to the batch cost estimator to estimate cost variance again and then may be adjusted through the rebalancer again. This loop may be repeated for a number of times until a heuristic tells it to stop. For example, in one implementation, this loop is repeated by a fixed number proportional to the mini-batch size. In another implementation where worker compute profiler is involved, this loop doesn't repeat at all.

When the loop stopped, the current local batch assignment may be used as the optimal local batch assignment. In some embodiments, the best local batch assignment may be recorded in the batch cost estimator ←→rebalancer loop and the best local batch assignment may be used finally. The samples in the mini batch may be assigned to the workers according to the best local batch assignment.

Compared with the embodiments of algorithms 1 and 2, the embodiments including the algorithm 3 may incrementally reduce the work of heavy (busy) workers and add work to light (idle) workers by adjusting their local batch size, so after certain iterations of rebalance, all the workers are doing almost same duration of work. In some embodiments, the iterations may run virtually between batch cost estimator and rebalancer, so the local batches are balanced before assigned to workers. These embodiments are suitable when the batch cost model (or the heuristic function used to estimate the cost of the local batch) is accurate and/or can be learned. In some embodiments, adjusting is done between training iterations with the input from worker compute profiler, so balance between workers could be established after certain number of iterations. These embodiments are suitable when the batch cost model is unknown.

The solutions with the algorithm 1 (zigzag round robin balancing) or the algorithm 2 (greedy bag balancing), which may be collectively called as a first form, may be used when model has unpadded implementation, and they may provide maximum performance improvement. The solutions with the algorithm 3, which may be called as a second form, may be used in both padded model implementation and unpadded model implementation. When the model does not have unpadded implementation, or unpadded implementation has low compute efficiency, or the computing device itself does not have equal compute capacity, the solutions with the algorithm 3 can still bring close to ideal performance. In other words, the first form may provide general solutions to mitigate or avoid straggler effect in distributed data parallel training, while the second form may mitigate or avoid straggler effect given whether the straggler effect is caused from variance in sample volume distribution or from variance in computation capacity among workers.

The enwiki dataset of FIG. 1 may be used to simulate the effect of both the first form and the second form. This dataset is used for BERT language model training. A simple cost model is used where the cost of a local batch is proportional to the total (padded) volume of the local batch. Two common scenarios are simulated. In scenario 1, mini batch size is 256 and there are 16 workers. In scenario 2, mini batch size is 2048 and there are 128 workers. In the first form, the unpadded implementation of the model is simulated. In the second form, worker compute profiler is not used and the rebalancing loop is iterated with mini batch size (BS)/2 times and the best local batch assignment is recorded. The padded implementation of the model is simulated in the second form. The simulation is run 1000 times to get accurate estimation of improvement.

With the above simulation setting, simulation results of typical solutions for avoiding straggler effect are as follows. For padded input, straggler effect causes 2.0× loss of compute efficiency in both 16 worker and 128 worker scenarios. For unpadded input, straggler effect causes 1.3× loss of compute efficiency for 16 workers, and 1.5× loss of compute efficiency for 128 workers.

In contrast, when the first form of the disclosure is applied to unpadded input, both zigzag round robin balancing and greedy bag balancing reduce straggler effect to almost 1.00× (no straggler effect at all). This is 1.3× improvement for 16 workers and 1.5× improvement for 128 workers compared with the above simulation results of typical solutions. When the second form of the disclosure is applied to padded input, straggler effect of 16 workers is reduced from 2.0× (of the typical solutions) to 1.135×. For 128 workers, straggler effect is reduced from 2.0× (of the typical solutions) to 1.075×. This is 1.76× improvement on 16 workers and 1.86× improvement on 128 workers.

The improvement above is merely an example given corresponding simulation setting. Further improvement may be achieved based on different simulation settings. The disclosure is not limited in this aspect.

When the concept of the disclosure is used, the system would show uneven local batch size across different workers in distributed training. This is unusual as normally local batch size is equal across different workers. The samples in a local batch also have different distribution of volume than random sampling, which indicates that batch rebalance of the disclosure is applied among local batches.

When the concept of the disclosure is used, tensors used for DNN input may be considered and input volume distribution in local batch may be computed. If the volume distribution is different from random sampling result with error margin, volumes for each rank may be summed up. If the sum appears close, then rebalancing technique of the disclosure is used. The system then may be checked to find out the component that compute cost and the component that rebalance among local batches.

The concept of the disclosure may be applied to framework extensions such as tersor flow (TF) (e.g., Intel extension for tensor flow) plugin or Intel Extension for PyTorch (IPEX). However, the disclosure is not limited in this aspect.

This disclosure proposes methods to redistribute the mini batch among workers with a balanced strategy. In the methods, for example, samples of a mini batch is sorted by their volume, then the samples are assigned to each worker (local batch) in a way that each worker requires approximately similar duration to run a training iteration. In an example, the sorted samples are assigned to workers in a zigzag round robin fashion. In another example, the sorted samples are assign to workers one by one, each time assigned to the worker with least estimated duration to complete computation. In yet another example, some workers train samples with small volume and some workers train samples with large volume, for a worker that train samples of small volume, more samples are assigned to this worker, for a worker that train samples of large volume, less samples are assigned to this worker. Other solutions may be obtained based on the concept of the disclosure, which is not limited in the disclosure.

This disclosure may solve the straggler effect so as to improve scaling efficiency of large-scale distributed DL training systems and provide better Return on Investment (ROI) of distributed DL solutions.

Figure 7:
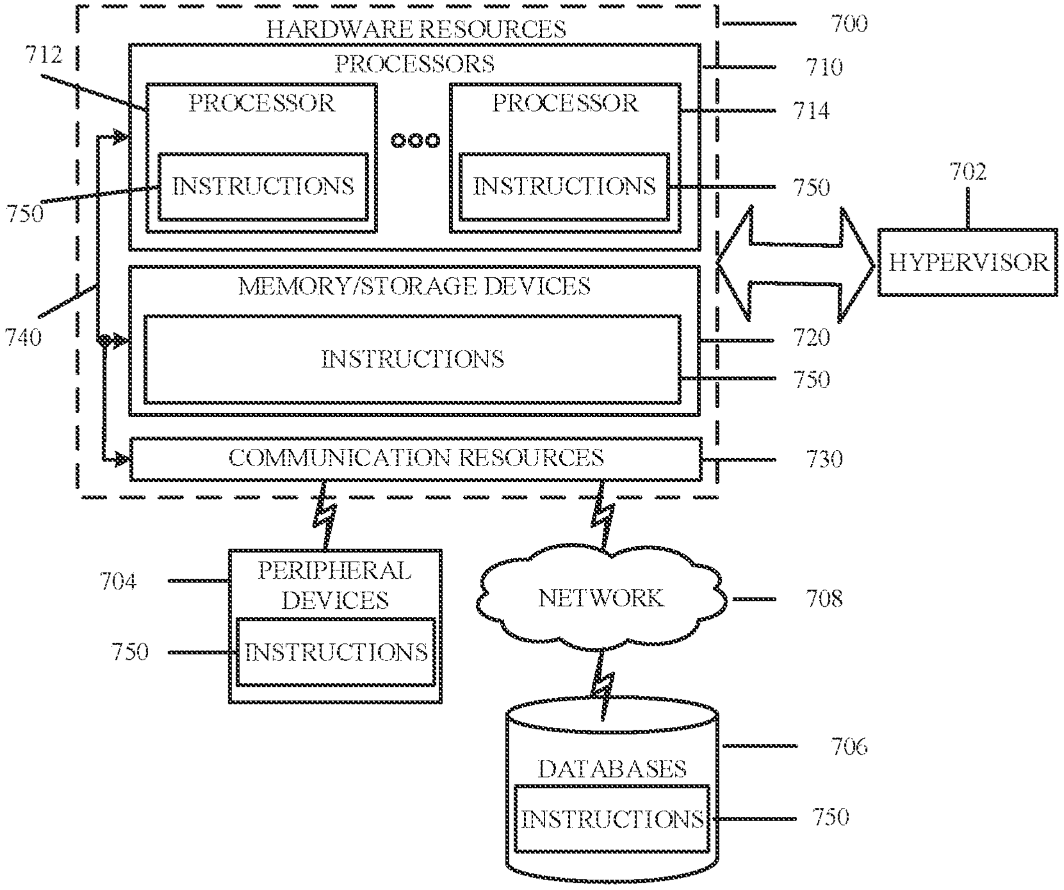
FIG. 7 is a block diagram illustrating components, according to some example embodiments, able to read instructions from a machine-readable or computer-readable medium and perform any one or more of the methodologies discussed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Figure 8:
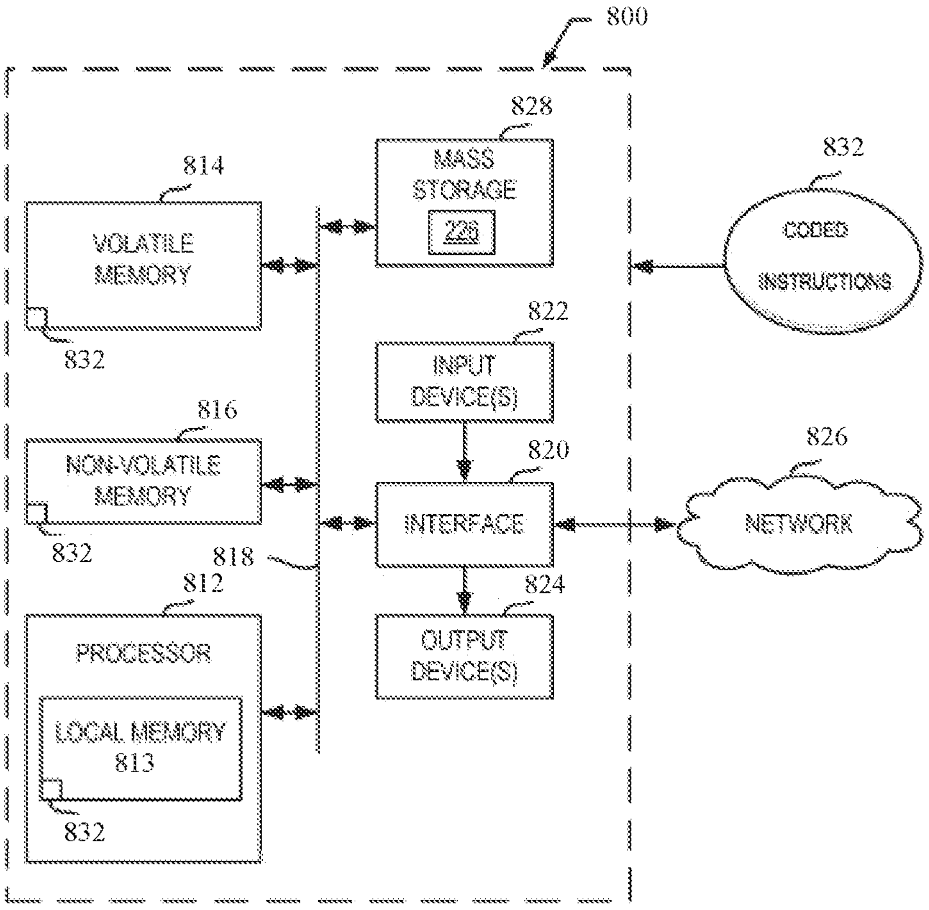
FIG. 8 is a block diagram of an example processor platform in accordance with some embodiments of the disclosure.

FIG. 8 is a block diagram of an example processor platform in accordance with some embodiments of the disclosure. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In some embodiments, the processor implements one or more of the balanced distributed data loader, the sample dispatcher, the batch cost estimator, the rebalancer, and the worker compute profiler described above.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

Machine executable instructions 832 may be stored in the mass storage device 828, in the volatile memory 814, in the non-volatile memory 816, and/or on a removable non-transitory computer readable storage medium such as a CD or DVD.

The following paragraphs describe examples of various embodiments.

Example 1 includes an apparatus, comprising: interface circuitry; and processor circuitry coupled with the interface circuitry, wherein the processor circuitry is to: obtain sorted samples of a mini batch via the interface circuitry, wherein the sorted samples are in an ascend or descend order based on a volume of each of the samples; and assign the sorted samples to each of a plurality of local batches one by one in an order from a first local batch to a last local batch of the plurality of local batches and then from the last local batch to the first local batch until all of the sorted samples are assigned.

Example 2 includes the apparatus of Example 1, wherein the sorted samples are in the descend order when a size of the mini batch is indivisible by a number of the plurality of local batches.

Example 3 includes the apparatus of Example 1, wherein the processor circuitry is further to: assign samples in each of the plurality of local batches to a respective worker for distributed training of the assigned samples.

Example 4 includes the apparatus of Example 1, wherein each of the plurality of local batches is empty initially.

Example 5 includes the apparatus of Example 1, wherein the mini batch is randomly sampled from a dataset.

Example 6 includes an apparatus, comprising: interface circuitry; and processor circuitry coupled with the interface circuitry, wherein the processor circuitry is to: obtain samples of a mini batch via the interface circuitry; estimate a cost of each of a plurality of local batches; and assign the samples to the plurality of local batches based on the cost of each of the plurality of local batches.

Example 7 includes the apparatus of Example 6, wherein the samples are sorted in a descend order based on a volume of each of the samples.

Example 8 includes the apparatus of Example 7, wherein the processor circuitry is further to: assign a first sample of the samples with a largest volume to a local batch of the plurality of local batches with a smallest cost; re-estimate the cost of each of the plurality of local patches; and assign a second sample of the samples with a largest volume among remaining unassigned samples to a local batch of the plurality of local batches with a smallest cost after the re-estimation.

Example 9 includes the apparatus of Example 8, wherein each of the plurality of local batches is empty initially.

Example 10 includes the apparatus of Example 6, wherein the samples are sorted in an ascend order based on a volume of each of the samples.

Example 11 includes the apparatus of Example 10, wherein the processor circuitry is further to: set a size for each of the plurality of local batches; assign the sorted samples to the plurality of local batches by sequentially filling out each of the plurality of local batches with the sorted samples, so that each local batch is assigned with a number of samples which is equal to the size of the local batch; estimate the cost of each of the plurality of local batches; adjust the size of a local batch of the plurality of local batches with a largest cost and/or the size of a local batch of the plurality of local batches with a smallest cost; and re-assign the sorted samples to the plurality of local batches by sequentially filling out each of the plurality of local batches with the sorted samples, so that each local batch is assigned with a number of samples which is equal to the adjusted size of the local batch.

Example 12 includes the apparatus of Example 11, wherein the processor circuitry is further to: perform the estimation, the adjustment and the re-assignment a plurality of times.

Example 13 includes the apparatus of Example 12, wherein a number of the plurality of times is determined based on a heuristic function.

Example 14 includes the apparatus of Example 11, wherein the processor circuitry is further to adjust the size of the local batch of the plurality of local batches with the largest cost and/or the size of the local batch of the plurality of local batches with the smallest cost based on a heuristic function.

Example 15 includes the apparatus of Example 11, wherein the processor circuitry is further to adjust the size of the local batch of the plurality of local batches with the largest cost and/or the size of the local batch of the plurality of local batches with the smallest cost by: reducing the size of the local batch of the plurality of local batches with the largest cost; and/or increasing the size of the local batch of the plurality of local batches with the smallest cost.

Example 16 includes the apparatus of Example 11, wherein the size set for each of the plurality of local batches is the same.

Example 17 includes the apparatus of Example 11, wherein before the cost of each of the plurality of local batches is estimated, the processor circuitry is further to: pad each of the samples assigned for each local batch, so that a volume of each sample in the local batch is equal to a largest volume among the samples assigned for the local batch.

Example 18 includes the apparatus of Example 6, wherein the processor circuitry is further to: assign samples in each of the plurality of local batches to a respective worker for distributed training of the assigned samples.

Example 19 includes the apparatus of Example 18, wherein the cost of each of the plurality of local batches is based on: a compute time of the respective worker for the distributed training of the assigned samples; or a total volume of the assigned samples for the respective worker.

Example 20 includes the apparatus of Example 6, wherein the mini batch is randomly sampled from a dataset.

Example 21 includes a method, comprising: obtaining sorted samples of a mini batch, wherein the sorted samples are in an ascend or descend order based on a volume of each of the samples; and assigning the sorted samples to each of a plurality of local batches one by one in an order from a first local batch to a last local batch of the plurality of local batches and then from the last local batch to the first local batch until all of the sorted samples are assigned.

Example 22 includes the method of Example 21, wherein the sorted samples are in the descend order when a size of the mini batch is indivisible by a number of the plurality of local batches.

Example 23 includes the method of Example 21, further comprising: assigning samples in each of the plurality of local batches to a respective worker for distributed training of the assigned samples.

Example 24 includes the method of Example 21, wherein each of the plurality of local batches is empty initially.

Example 25 includes the method of Example 21, wherein the mini batch is randomly sampled from a dataset.

Example 26 includes a method, comprising: obtaining samples of a mini batch; estimating a cost of each of a plurality of local batches; and assigning the samples to the plurality of local batches based on the cost of each of the plurality of local batches.

Example 27 includes the method of Example 26, wherein the samples are sorted in a descend order based on a volume of each of the samples.

Example 28 includes the method of Example 27, further comprising: assigning a first sample of the samples with a largest volume to a local batch of the plurality of local batches with a smallest cost; re-estimating the cost of each of the plurality of local patches; and assigning a second sample of the samples with a largest volume among remaining unassigned samples to a local batch of the plurality of local batches with a smallest cost after the re-estimation.

Example 29 includes the method of Example 28, wherein each of the plurality of local batches is empty initially.

Example 30 includes the method of Example 26, wherein the samples are sorted in an ascend order based on a volume of each of the samples.

Example 31 includes the method of Example 30, further comprising: setting a size for each of the plurality of local batches; assigning the sorted samples to the plurality of local batches by sequentially filling out each of the plurality of local batches with the sorted samples, so that each local batch is assigned with a number of samples which is equal to the size of the local batch; estimating the cost of each of the plurality of local batches; adjusting the size of a local batch of the plurality of local batches with a largest cost and/or the size of a local batch of the plurality of local batches with a smallest cost; and re-assigning the sorted samples to the plurality of local batches by sequentially filling out each of the plurality of local batches with the sorted samples, so that each local batch is assigned with a number of samples which is equal to the adjusted size of the local batch.

Example 32 includes the method of Example 31, further comprising: performing the estimating, the adjusting and the re-assigning a plurality of times.

Example 33 includes the method of Example 32, wherein a number of the plurality of times is determined based on a heuristic function.

Example 34 includes the method of Example 31, wherein the adjusting is based on a heuristic function.

Example 35 includes the method of Example 31, wherein the adjusting comprises: reducing the size of the local batch of the plurality of local batches with the largest cost; and/or increasing the size of the local batch of the plurality of local batches with the smallest cost.

Example 36 includes the method of Example 31, wherein the size set for each of the plurality of local batches is the same.

Example 37 includes the method of Example 31, wherein before the cost of each of the plurality of local batches is estimated, the method further comprises: padding each of the samples assigned for each local batch, so that a volume of each sample in the local batch is equal to a largest volume among the samples assigned for the local batch.

Example 38 includes the method of Example 26, further comprising: assigning samples in each of the plurality of local batches to a respective worker for distributed training of the assigned samples.

Example 39 includes the method of Example 38, wherein the cost of each of the plurality of local batches is based on: a compute time of the respective worker for the distributed training of the assigned samples; or a total volume of the assigned samples for the respective worker.

Example 40 includes the method of Example 26, wherein the mini batch is randomly sampled from a dataset.

Example 41 includes an apparatus, comprising: means for obtaining sorted samples of a mini batch, wherein the sorted samples are in an ascend or descend order based on a volume of each of the samples; and means for assigning the sorted samples to each of a plurality of local batches one by one in an order from a first local batch to a last local batch of the plurality of local batches and then from the last local batch to the first local batch until all of the sorted samples are assigned.

Example 42 includes the apparatus of Example 41, wherein the sorted samples are in the descend order when a size of the mini batch is indivisible by a number of the plurality of local batches.

Example 43 includes the apparatus of Example 41, further comprising: means for assigning samples in each of the plurality of local batches to a respective worker for distributed training of the assigned samples.

Example 44 includes the apparatus of Example 41, wherein each of the plurality of local batches is empty initially.

Example 45 includes the apparatus of Example 41, wherein the mini batch is randomly sampled from a dataset.

Example 46 includes an apparatus, comprising: means for obtaining samples of a mini batch; means for estimating a cost of each of a plurality of local batches; and means for assigning the samples to the plurality of local batches based on the cost of each of the plurality of local batches.

Example 47 includes the apparatus of Example 46, wherein the samples are sorted in a descend order based on a volume of each of the samples.

Example 48 includes the apparatus of Example 47, further comprising: means for assigning a first sample of the samples with a largest volume to a local batch of the plurality of local batches with a smallest cost; means for re-estimating the cost of each of the plurality of local patches; and means for assigning a second sample of the samples with a largest volume among remaining unassigned samples to a local batch of the plurality of local batches with a smallest cost after the re-estimation.

Example 49 includes the apparatus of Example 48, wherein each of the plurality of local batches is empty initially.

Example 50 includes the apparatus of Example 46, wherein the samples are sorted in an ascend order based on a volume of each of the samples.

Example 51 includes the apparatus of Example 50, further comprising: means for setting a size for each of the plurality of local batches; means for assigning the sorted samples to the plurality of local batches by sequentially filling out each of the plurality of local batches with the sorted samples, so that each local batch is assigned with a number of samples which is equal to the size of the local batch; means for estimating the cost of each of the plurality of local batches; means for adjusting the size of a local batch of the plurality of local batches with a largest cost and/or the size of a local batch of the plurality of local batches with a smallest cost; and means for re-assigning the sorted samples to the plurality of local batches by sequentially filling out each of the plurality of local batches with the sorted samples, so that each local batch is assigned with a number of samples which is equal to the adjusted size of the local batch.

Example 52 includes the apparatus of Example 51, further comprising: means for performing the estimating, the adjusting and the re-assigning a plurality of times.

Example 53 includes the apparatus of Example 52, wherein a number of the plurality of times is determined based on a heuristic function.

Example 54 includes the apparatus of Example 51, wherein the means for adjusting comprises means for adjusting the size of the local batch of the plurality of local batches with the largest cost and/or the size of the local batch of the plurality of local batches with the smallest cost is based on a heuristic function.

Example 55 includes the apparatus of Example 51, wherein the means for adjusting comprises: means for reducing the size of the local batch of the plurality of local batches with the largest cost; and/or means for increasing the size of the local batch of the plurality of local batches with the smallest cost.

Example 56 includes the apparatus of Example 51, wherein the size set for each of the plurality of local batches is the same.

Example 57 includes the apparatus of Example 51, wherein the apparatus further comprises: means for padding each of the samples assigned for each local batch before the cost of the local batch is estimated, so that a volume of each sample in the local batch is equal to a largest volume among the samples assigned for the local batch.

Example 58 includes the apparatus of Example 46, further comprising: means for assigning samples in each of the plurality of local batches to a respective worker for distributed training of the assigned samples.

Example 59 includes the apparatus of Example 58, wherein the cost of each of the plurality of local batches is based on: a compute time of the respective worker for the distributed training of the assigned samples; or a total volume of the assigned samples for the respective worker.

Example 60 includes the apparatus of Example 46, wherein the mini batch is randomly sampled from a dataset.

Example 61 includes a computer-readable medium having instructions stored thereon, the instructions when executed by processor circuitry cause the processor circuitry to perform the method of any of Examples 21 to 40.

Example 62 includes an apparatus as shown and described in the description.

Example 63 includes a method performed at an apparatus as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. An apparatus, comprising:

interface circuitry; and processor circuitry coupled with the interface circuitry, wherein the processor circuitry is to:

obtain sorted samples of a mini batch via the interface circuitry, wherein the sorted samples are in an ascend order based on a volume of each of the samples;

set a size for each of a plurality of local batches;

assign the sorted samples to the plurality of local batches by sequentially filling out each of the plurality of local batches with the sorted samples, so that each local batch is assigned with a number of samples which is equal to the size of the local batch;

adjust the size of a local batch of the plurality of local batches with at least one of a largest cost or the size of a local batch of the plurality of local batches with a smallest cost; and re-assign the sorted samples to the plurality of local batches by sequentially filling out each of the plurality of local batches with the sorted samples, so that each local batch is assigned with a number of samples which is equal to the adjusted size of the local batch.

2. The apparatus of claim 1, wherein the processor circuitry is further to:

perform the estimation, the adjustment and the re-assignment a plurality of times.

3. The apparatus of claim 2, wherein a number of the plurality of times is determined based on a heuristic function.

4. The apparatus of claim 1, wherein the processor circuitry is further to adjust the size of the local batch of the plurality of local batches with at least one of the largest cost or the size of the local batch of the plurality of local batches with the smallest cost based on a heuristic function.

5. The apparatus of claim 1, wherein the processor circuitry is further to adjust the size of the local batch of the plurality of local batches with at least one of the largest cost or the size of the local batch of the plurality of local batches with the smallest cost by at least one of:

reducing the size of the local batch of the plurality of local batches with the largest cost; or increasing the size of the local batch of the plurality of local batches with the smallest cost.

6. The apparatus of claim 1, wherein the size set for each of the plurality of local batches is the same or different.

7. The apparatus of claim 1, wherein before the cost of each of the plurality of local batches is estimated, the processor circuitry is further to:

pad each of the samples assigned for each local batch, so that a volume of each sample in the local batch is equal to a largest volume among the samples assigned for the local batch.

8. The apparatus of claim 1, wherein the processor circuitry is further to:

assign the sorted samples in each of the plurality of local batches to a respective worker for distributed training of the assigned samples.

9. The apparatus of claim 8, wherein the cost of each of the plurality of local batches is based on at least one of:

a compute time of the respective worker for the distributed training of the assigned samples; or a total volume of the assigned samples for the respective worker.

10. The apparatus of claim 1, wherein the mini batch is randomly sampled from a dataset.

11. At least one non-transitory computer readable medium having instructions stored thereon, that cause at least one processor circuit to at least:

obtain sorted samples of a mini batch, wherein the sorted samples are in an ascend order based on a volume of each of the samples;

estimate a cost of each of a plurality of local batches;

set a size for each of the plurality of local batches;

assign the sorted samples to the plurality of local batches by sequentially filling out each of the plurality of local batches with the sorted samples, so that each local batch is assigned with a number of samples which is equal to the size of the local batch;

adjust the size of a local batch of the plurality of local batches with at least one of a largest cost or the size of a local batch of the plurality of local batches with a smallest cost; and re-assign the sorted samples to the plurality of local batches by sequentially filling out each of the plurality of local batches with the sorted samples, so that each local batch is assigned with a number of samples which is equal to the adjusted size of the local batch.

12. The at least one non-transitory computer readable medium of claim 11, wherein the mini batch is randomly sampled from a dataset.

13. The at least one non-transitory computer readable medium of claim 11, wherein the instructions cause one or more of the at least one processor circuit to:

perform the estimation, the adjustment and the re-assignment a plurality of times.

14. The at least one non-transitory computer readable medium of claim 13, wherein a number of the plurality of times is determined based on a heuristic function.

15. The at least one non-transitory computer readable medium of claim 11, wherein the instructions cause one or more of the at least one processor circuit to adjust the size of the local batch of the plurality of local batches with at least one of the largest cost or the size of the local batch of the plurality of local batches with the smallest cost based on a heuristic function.

16. The at least one non-transitory computer readable medium of claim 11, wherein the instructions cause one or more of the at least one processor circuit adjust the size of the local batch of the plurality of local batches with at least one of the largest cost or the size of the local batch of the plurality of local batches with the smallest cost by at least one of:

reducing the size of the local batch of the plurality of local batches with the largest cost; or increasing the size of the local batch of the plurality of local batches with the smallest cost.

17. The at least one non-transitory computer readable medium of claim 11, wherein the size set for each of the plurality of local batches is the same or different.

18. The at least one non-transitory computer readable medium of claim 11, wherein before the cost of each of the plurality of local batches is estimated, the instructions cause one or more of the at least one processor circuit to:

pad each of the samples assigned for each local batch, so that a volume of each sample in the local batch is equal to a largest volume among the samples assigned for the local batch.

19. The at least one non-transitory computer readable medium of claim 11, wherein the instructions cause one or more of the at least one processor circuit to:

assign the sorted samples in each of the plurality of local batches to a respective worker for distributed training of the assigned samples.

20. The at least one non-transitory computer readable medium of claim 19, wherein the cost of each of the plurality of local batches is based on at least one of:

a compute time of the respective worker for the distributed training of the assigned samples; or a total volume of the assigned samples for the respective worker.

21. The at least one non-transitory computer readable medium of claim 11, wherein the mini batch is randomly sampled from a dataset.

22. A method comprising:

obtaining sorted samples of a mini batch, wherein the sorted samples are in an ascend order based on a volume of each of the samples;

estimating a cost of each of a plurality of local batches;

setting a size for each of the plurality of local batches;

assigning the sorted samples to the plurality of local batches by sequentially filling out each of the plurality of local batches with the sorted samples, so that each local batch is assigned with a number of samples which is equal to the size of the local batch;

adjusting the size of a local batch of the plurality of local batches with at least one of a largest cost or the size of a local batch of the plurality of local batches with a smallest cost; and re-assigning the sorted samples to the plurality of local batches by sequentially filling out each of the plurality of local batches with the sorted samples, so that each local batch is assigned with a number of samples which is equal to the adjusted size of the local batch.

23. An apparatus comprising:

means for obtaining sorted samples of a mini batch, wherein the sorted samples are in an ascend order based on a volume of each of the samples;

means for estimating a cost of each of a plurality of local batches;

means for setting a size for each of the plurality of local batches;

means for assigning the sorted samples to the plurality of local batches by sequentially filling out each of the plurality of local batches with the sorted samples, so that each local batch is assigned with a number of samples which is equal to the size of the local batch;

means for adjusting the size of a local batch of the plurality of local batches with at least one of a largest cost or the size of a local batch of the plurality of local batches with a smallest cost; and means for re-assigning the sorted samples to the plurality of local batches by sequentially filling out each of the plurality of local batches with the sorted samples, so that each local batch is assigned with a number of samples which is equal to the adjusted size of the local batch.

* * * * *